US006646405B2

(12) United States Patent
McConnell et al.

(10) Patent No.: US 6,646,405 B2
(45) Date of Patent: Nov. 11, 2003

(54) SYSTEM AND METHOD FOR USING JOINT TORQUE FEEDBACK TO PREVENT OSCILLATION IN A FLEXIBLE ROBOTIC MANIPULATOR

(75) Inventors: Kenneth G. McConnell, Ames, IA (US); Chad E. Bouton, Delaware, OH (US)

(73) Assignee: Iowa State University Research Foundation, Inc., Ames, IA (US)

( * ) Notice: Subject to any disclaimer, the term of this patent is extended or adjusted under 35 U.S.C. 154(b) by 143 days.

(21) Appl. No.: 09/803,046

(22) Filed: Mar. 12, 2001

(65) Prior Publication Data

US 2001/0045807 A1 Nov. 29, 2001

Related U.S. Application Data

(60) Provisional application No. 60/188,198, filed on Mar. 10, 2000.

(51) Int. Cl.[7] .............................................. G05B 19/04
(52) U.S. Cl. .................................................. 318/568.2
(58) Field of Search ........................ 318/568.11–568.25

(56) References Cited

U.S. PATENT DOCUMENTS

| | | | |
|---|---|---|---|
| 4,925,312 A | | 5/1990 | Onaga et al. |
| 4,943,759 A | * | 7/1990 | Sakamoto et al. .......... 318/434 |
| 5,049,797 A | | 9/1991 | Phillips |
| 5,056,038 A | * | 10/1991 | Kuno et al. .................. 700/260 |
| 5,155,423 A | * | 10/1992 | Karlen et al. ............ 318/568.1 |
| 5,523,662 A | * | 6/1996 | Goldenberg et al. ... 318/568.11 |
| 5,581,166 A | * | 12/1996 | Eismann et al. ....... 318/568.18 |
| 5,594,309 A | | 1/1997 | McConnell et al. |
| 5,767,648 A | * | 6/1998 | Morel et al. ............. 318/568.1 |
| 6,002,232 A | | 12/1999 | McConnell et al. |
| 6,204,619 B1 | * | 3/2001 | Gu et al. ........................ 254/1 |

OTHER PUBLICATIONS

Enrico D'Amato et al., "Dynamic Modelling of Mobile Flexible Structures for Improvement of Motion Control," Proceedings, 12 International Modal Analysis Conference, Jan. 1994, Honolulu, pp. 799–805.
N. C. Singer et al., "Preshaping Command Inputs to Reduce System Vibration," *Transactions of the ASME*, vol. 112, Mar. 1990, pp. 76–82.
James M. Hyde et al., "Controlling Contact Transition," *IEEE Control Systems*, Feb. 1994, pp. 25–30.

* cited by examiner

*Primary Examiner*—Jeffrey Donels
(74) *Attorney, Agent, or Firm*—Dickstein Shapiro Morin & Oshinsky LLP

(57) ABSTRACT

A preferred embodiment of the invention includes a control system (and corresponding method) which monitors and controls both joint torque and arm position during operation of a device such as a manipulator, whereby oscillation is rapidly removed when the system is disturbed by either movement, stopping of the system after completing a movement, by disturbance from external forces, or any other disturbance. Furthermore, the system can achieve rapid motion over a wide manipulator payload range. This is achieved in a preferred embodiment by providing control of torque and thereby allowing control of the arm deflection. In this illustrative arrangement, the joint torque takes on high levels (below the arm's elastic limit), allowing rapid motion without causing arm oscillation. It has been found that the arm can be transformed from a cantilever-type structure to a pin-free-type structure. The invention allows for high joint torque levels with low frequency content, thereby enabling rapid arm movement without induced oscillation. The invention also provides for rapid arm stabilization in the event that the arm comes into contact with external disturbances.

20 Claims, 17 Drawing Sheets

System Block Diagram.

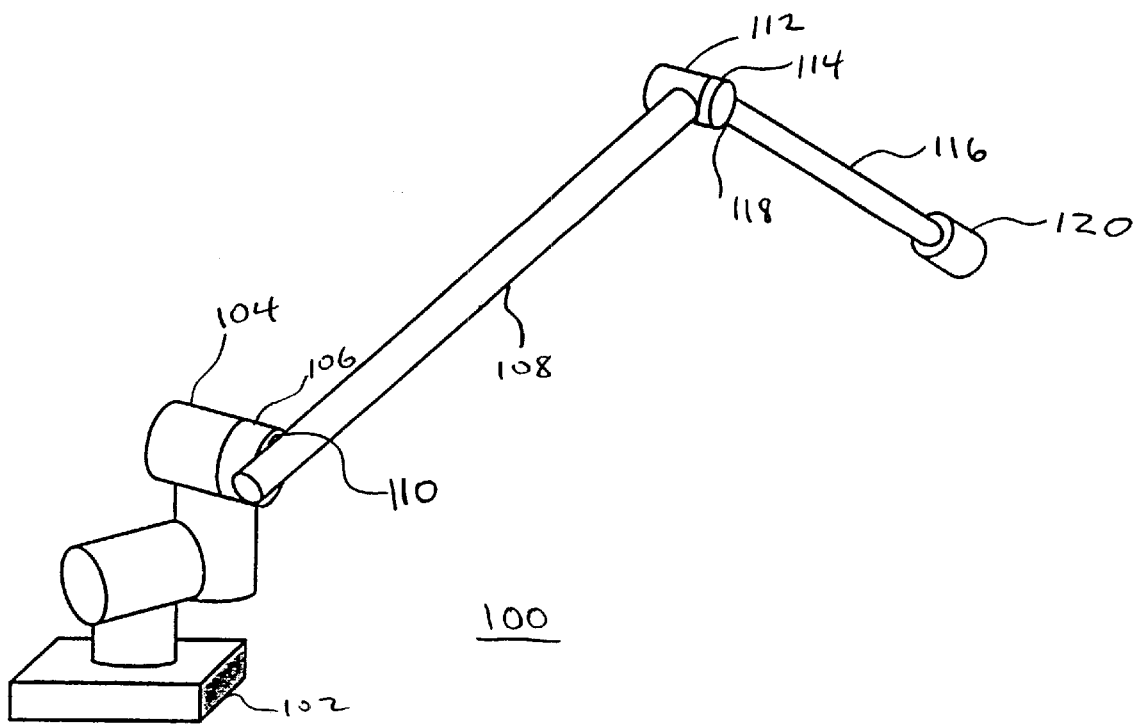
Figure 1. Multiaxis Flexible Robotic Manipulator.

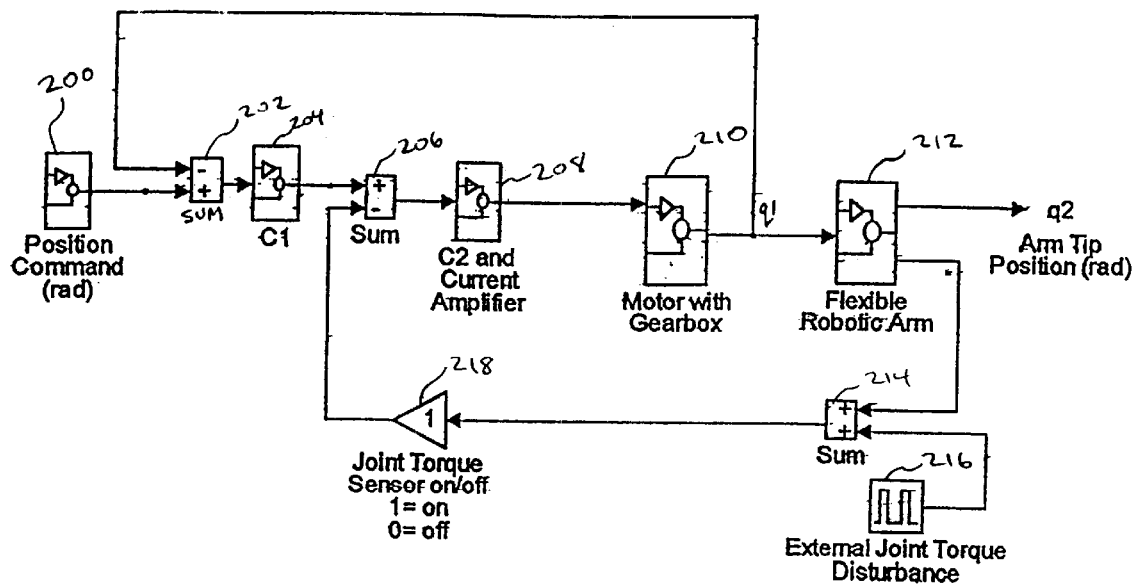
Figure 2.  System Block Diagram.
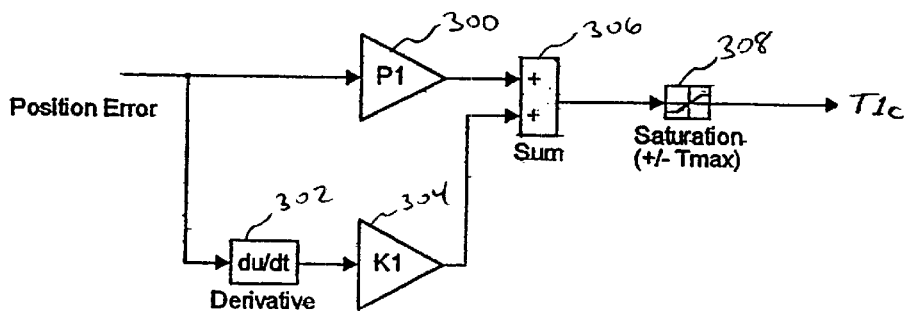
Figure 3. Controller 1 (C1).

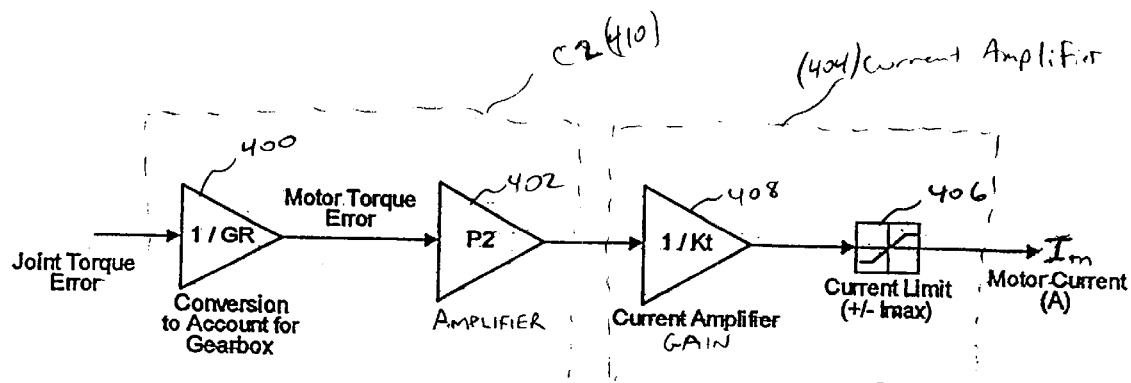
Figure 4. Controller 2 (C2) and Current Amplifier.
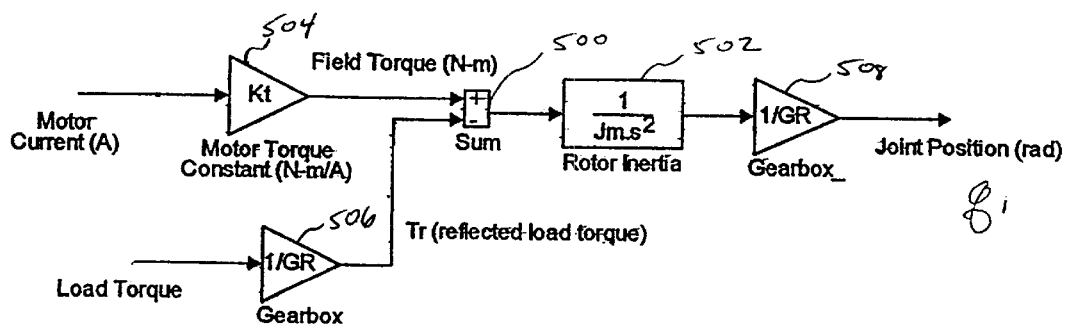
Figure 5. Motor with Gearbox.

Flexible Robotic Arm.

Closed Loop System Frequency Response (Payload is 50 g).

Closed Loop System Frequency Response (Payload is 120 g).

Joint Torque Sensor Off (Payload is 50 g).

Joint Torque Sensor Off (Payload is 120-g).

Time Response with Joint Torque Sensor On, 30 deg. Command (120gm Payload)

Time Response with Joint Torque Sensor On, 60 deg. Command (120gm Payload)

Time Response With Joint Torque Sensor On, 90 Deg. Command (120 gm Payload)

Time Response With Joint Torque Sensor On, 30 Deg. Command (50 gm Payload)

Time Response With Joint Torque Sensor On, 60 Deg. Command (50gm Payload)

Time Response With Joint Torque Sensor On, 90 Deg. Command (50 gm Payload)

Response to Two Disturbances (1 N-m, 30ms) with Joint Torque Sensor On (120gm Payload)

Response to Two Disturbances (1 N-m, 30ms) with Joint Torque Sensor On (50gm Payload)

US 6,646,405 B2

SYSTEM AND METHOD FOR USING JOINT TORQUE FEEDBACK TO PREVENT OSCILLATION IN A FLEXIBLE ROBOTIC MANIPULATOR

This application is based upon a provisional application Ser. No. 60/188,198, filed Mar. 10, 2000, the entire content of which is incorporated herein by reference, and as such, claims priority under 35 U.S.C. §119(e).

BACKGROUND

Robotic manipulators can be found performing numerous industrial applications. Notably, such manipulators have also been used in orbit during space shuttle missions for tasks such as satellite repair, and will also be used throughout the construction of the planned International Space Station. Lightweight robotic manipulators, as shown in, for example, U.S. Pat. No. 6,002,232 to McConnell et al., can offer power savings for industry and space applications since less manipulator mass is accelerated during motion. These manipulators, however, often have flexible members (e.g., arms) that are susceptible to unwanted vibration or oscillation during motion. Any unwanted oscillations that increase the manipulator move time (and therefore mission time) can be quite costly and results in decreased work efficiency.

Various attempts to reduce the unwanted vibration or oscillation have been made. For example, U.S. Pat. No. 5,594,309 to McConnell et al. takes advantage of the system's natural response to step inputs. A three step method is utilized to achieve maximum response with minimum time, while being open loop adaptive to changing system characteristics that are determined during its response.

Another approach was taken in Singer, N. C., Seering, W. P., "Preshaping Command Inputs to Reduce System Vibration," Transactions, ASME, Vol. 112, March 1990, p. 76–62 ("Singer method"). The Singer method consists of preshaping an open loop command sequence in order to achieve the desired response. This method requires prior knowledge of the system's characteristics to be effective. However, when the Singer method is taken to its limit, it takes twice as long as the method in U.S. Pat. No. 5,594,309 to achieve the same response.

Different variations of the Singer method have also been attempted. Hyde, J. M. and Cutkosky, M. R, refer in "Controlling Contact Transition," IEEE Control Systems, February 1994, p. 25–30 (the "Hyde method"), an adaptation of the Singer method that uses preshaping to solve the "touching" problem that can occur at the end of the motion and set the robot arm into vibration. D'Amato, E., Di Gregorio, P., and Durante, F., refer in "Dynamic Modeling of Mobile Flexible Structures for Improvement of Motion Control," Proceedings, 12 International Modal Analysis Conference, Jan. 31-Feb. 3, 1994, Honolulu, P. 799–805 (the "D'Amato method") an application of the Singer method to a flexible cantilevered arm type of robot with limited success in its time response. It was found that in order to have rapid response, the robot structures need to be lighter and usually more flexible so that the robot's mechanical vibration characteristics become more important. Many practical applications do not lend themselves to such limitations.

U.S. Pat. No. 5,049,797 to Phillips employs an arm tip deflection sensor. The feedback signal from this deflection sensor is used to reduce further deflection. Reducing arm deflection, however, reduces the force delivered to the payload and increases the overall system response time.

U.S. Pat. No. 4,925,312 to Onaga et al. refers to a control structure where the motor field torque is controlled by an inner loop and the position and velocity are governed by outer loops. This structure had previously been applied with some success to rigid robots. However, the Onaga structure is ineffective in controlling arm oscillations in flexible robots.

SUMMARY

A preferred embodiment of the invention includes a control system (and corresponding method) which monitors and controls both joint torque and arm position during operation of a device such as a manipulator, whereby oscillation is rapidly removed when the system is disturbed by either movement, stopping of the system after completing a movement, by disturbance from external forces, or any other disturbance. Furthermore, the system can achieve rapid motion over a wide manipulator payload range. This is achieved in a preferred embodiment by providing control of torque and thereby allowing control of the arm deflection. In this illustrative arrangement, the joint torque takes on high levels (below the arm's elastic limit), allowing rapid motion without causing arm oscillation. It has been found that the arm can be transformed from a cantilever-type structure to a pin-free-type structure. The invention allows for high joint torque levels with low frequency content, thereby enabling rapid arm movement without induced oscillation. The invention also provides for rapid arm stabilization in the event that the arm comes into contact with external disturbances.

BRIEF DESCRIPTION OF THE DRAWINGS

The advantages, features, and applications of the invention will be apparent from the following detailed description of preferred embodiments of the invention which is provided in connection with the accompanying drawings, in which:

FIG. 1 is an isometric view of a multi-axis flexible robotic manipulator in accordance with a preferred embodiment of the invention;

FIG. 2 is a system block diagram in accordance with a preferred embodiment of the invention;

FIG. 3 is a block diagram of an exemplary controller that may be used as controller 1 in the system of FIG. 2;

FIG. 4 is a block diagram of an exemplary controller that may be used as controller 2 and also an exemplary current amplifier of the system of FIG. 2;

FIG. 5 is a block diagram of an exemplary mathematical model of a motor with gear box that may be used to simulate the motor with gearbox of the system of FIG. 2;

DETAILED DESCRIPTION

Figure 6:
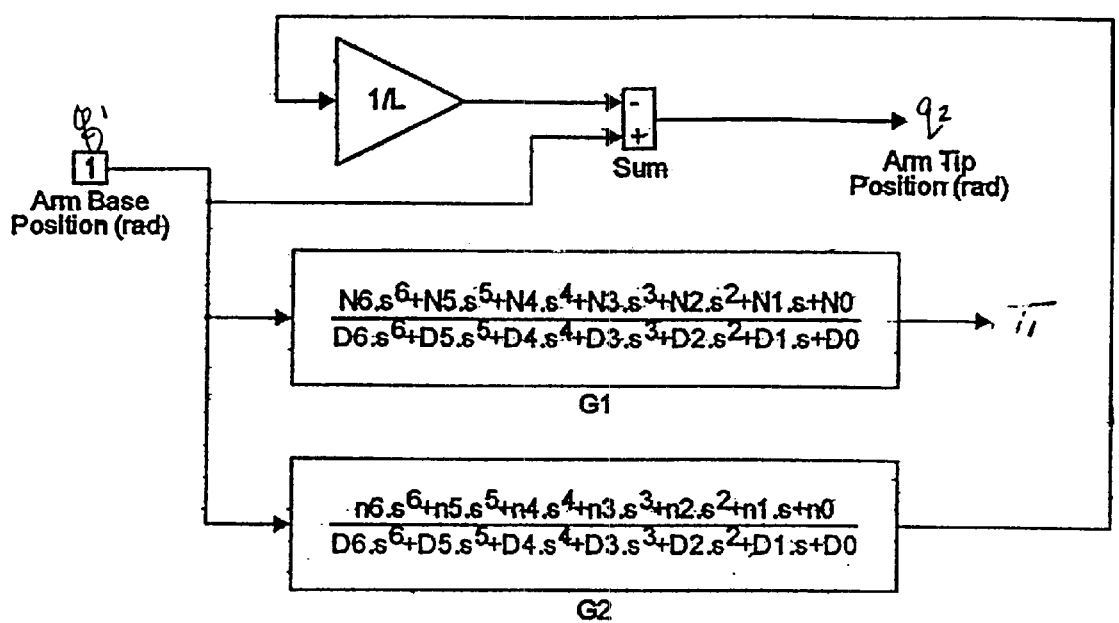
FIG. 6 is a mathematical model of a flexible arm that may be used to simulate the flexible arm of FIG. 1.

Preferred embodiments and applications of the invention will now be described with reference to FIGS. 1–19. Other embodiments may be realized and structural or logical changes may be made to the disclosed embodiments without departing from the spirit or scope of the invention. Although the embodiments illustrated herein particularly describe the invention as embodied in robotic manipulators, it should be readily apparent that the invention may be applied to any other system or device experiencing the same or related problems.

FIG. 1 depicts a multi-axis flexible robotic manipulator 100 in accordance with a preferred embodiment of the invention. The manipulator depicted contains a base 102 coupled to a first motor 104. It should be noted that as depicted in FIG. 1, coupled between base 102 and first motor 104 are a first vertical axis, a first horizontal axis and a second vertical axis, each of which may contain a motor and gearbox; however, they will be assumed not to respectively contain a motor and gearbox for purposes of this discussion. The first motor 104 is coupled to a first gearbox 106. Gearbox 106 is coupled to a first flexible arm 108 at joint 110. Flexible arm 108 is coupled to a second motor 112 which is in turn coupled to a second gearbox 114. Second gearbox 114 is coupled to second flexible arm 116 at joint 118. Situated at a distal end of second flexible arm 116 is arm tip 120.

In accordance with an embodiment of the invention, one or more joints (110, 118) of the manipulator contains a torque sensor. In a preferred embodiment, the torque sensor is located between an adjacent gearbox (e.g., 106) and a member such as flexible arm or link (e.g., 108) so as to sense the torque at the output of the gearbox (e.g., 106) that is being applied to the member. Control of the torque at this joint is preferred for moving the system rapidly without inducing oscillation. This torque cannot be effectively measured at the input of the gearbox (e.g., 106) or at the motor (e.g., 104) in most prior systems due to gearbox construction (e.g., worm type), primary gear inertia effects, and other problems. Even in systems without a gearbox, controlling the joint torque versus the motor field torque can become important when the motor rotary inertia is large as compared to the arm rigid body rotary inertia.

Driving a flexible robotic arm directly with a motor (no gearbox) by controlling the motor field torque is effective as long as the controller is sufficiently relaxed and the motor rotary inertia is small as compared to the robotic arm rotary inertia. When the motor inertia is too large, an effective cantilever boundary condition occurs for the arm and the primary mode (i.e., the lowest resonant frequency) of the arm becomes evident and troublesome. Preshaping techniques can be used to suppress this primary mode, but lower system resonances lead to longer preshape and response times.

The larger the arm joint inertia, the more pronounced the primary arm mode/oscillation becomes. When considering a flexible robotic arm configuration with a gearbox (e.g., depicted in FIG. 1), the rotary inertia of the motor 104 is reflected to the arm joint 110 and can become quite large. Since the reflected inertia is proportional to the square of the gear ratio, even small gear ratios can lead to an effective cantilever boundary condition at the arm joint 110. As will be described below, in a preferred embodiment of the invention, the arm joint torque is measured and controlled directly, thereby effectively bypassing the motor and gearbox.

Reference will now be made to a joint control system in accordance with a preferred embodiment of the invention as shown in FIG. 2. It should be noted that Tables 1 and 2 respectively define system constants and system variables referred to in the specification and drawings; therefore, reference should be made to these tables in connection with the specification and drawings.

TABLE 1

System Constants Defined.

| Name | Value | Units | Description |
|---|---|---|---|
| Tmax | 0.5 | N-m | Maximum Joint Torque Command Allowed |
| GR | 20 | | Gearbox Ratio |
| Kt | 0.16 | N-m/A | Motor Torque Constant |
| Imax | Tjmax/GR/Kt = 0.156 | A | Maximum Motor Current Allowed |
| Jm | 3.2e-5 | kg-m$^2$ | Motor Armature Rotary Inertia |
| L | 0.273 | m | Length of Flexible Robotic Arm |
| P1 | 0.4 | | Proportional Gain of Controller 1 (C1) |
| K1 | 0.12 | | Differential Gain of Controller 1 (C1) |
| P2 | 30 | | Proportional Gain of Controller 2 (C2) |

TABLE 2

System Variables Defined.

| | | |
|---|---|---|
| qc | deg or rad | Position Command |
| q1 | deg or rad | Joint Position or Arm Base Position |
| q2 | deg or rad | Arm Tip Position |
| T1c | N-m | Joint Torque Command |
| T1 | N-m | Joint Torque or Arm Base Torque (Actual/Measured) |
| Im | A | Motor Current |
| $G_f$ | | Joint Torque Sensor Term in System Transfer Function (1 = on, 0 = off) |

FIG. 2 depicts a block diagram of a joint control system locally employed in one or more of the joints (e.g., 110, 118) of a system (e.g., the manipulator of FIG. 1) in accordance with a preferred embodiment of the invention.

In the embodiment illustrated in the FIG. 1, manipulator 100 may incorporate, for example, two joint control systems (one for each joint). Position command unit 200 (FIG. 2) provides an instruction input such as a position command to the system instructing the manipulator to move in a certain manner. Such an input instruction may be generated in any one of a number of ways known in the art (e.g., software, operator input through user interface device, etc.). The instruction is fed into summer 202. Summer 202 also receives a feedback signal ("q1") describing the position of the given arm (e.g., 108) as measured at the given joint (e.g., 110). The output of summer 202 feeds into controller 1 ("C1"), which in turn feeds an output to summer 206. Summer 206 also receives an output from amplifier 218. Amplifier 218 amplifies an output from summer 214. Summer 214 outputs signals taking into account any external joint torque disturbances which might exist in the system environment (as determined or otherwise provided by module 216), and a joint torque measurement or representation for the given flexible robotic arm (e.g., 108). In a preferred embodiment, the position and torque of the given arm (e.g., 108) can be made by any known device, system, or other module represented in FIG. 2 as flexible robotic arm module 212. It should be noted that flexible robotic arm module 212 may be configured to utilize a processor-implemented mathematical model of flexible robotic arm 108, such as the one illustrated in FIG. 6 (discussed below). However, such a mathematical model is used herein for purposes of simulation only and is not required for practicing the invention.

The output of summer 206 feeds into controller 2 ("C2") and current amplifier (208), which in turn feeds its output to motor with gearbox 210. The output of the motor with gearbox 210 is considered in connection with the flexible arm module 212 of the flexible arm 108 and is preferably in the form of arm position q1. Arm tip position q2 is preferably output by the joint control system, representing the distal end of the given arm (e.g., 108) opposite the controlled joint (e.g., 110). It should be noted that the position of the ultimate arm tip of the manipulator (e.g., 120) as represented by q2 need not be part of a feedback loop.

In accordance with a preferred embodiment, controller C1 (204) may be implemented as shown in FIG. 3. As can be seen, the position error data received from summer 202 is fed into amplifier P1 (300). The derivative of the position error signal is acquired at unit 302, and fed into amplifier K1 (304). The outputs of both amplifiers P1, K1 are fed into summer 306, which is in turn, fed into saturation controller 308 for limiting the torque command input such that it does not exceed the maximum allowable motor torque or maximum allowable arm stress. In a preferred embodiment, the output of C1 is the joint torque command (T1c) in N-m. T1c may be fed into summer 206 (FIG. 2).

In accordance with a preferred embodiment, controller C2 and current amplifier (208 of FIG. 2) may be implemented as shown in FIG. 4. As depicted, C2 (410) contains a conversion amplifier 400 and amplifier P2 (402), and current amplifier 404 contains current amplifier gain 1/Kt (408) and, optionally, current limiter 406. A joint torque error signal is derived and output by summer 206 and fed into conversion amplifier 400 for converting the error signal to account for the gearbox (e.g., within 210 of FIG. 2) that is coupled to the joint sensor, thereby arriving at the motor torque error signal. The motor torque error signal is fed into amplifier P2 (402), which is then fed into current amplifier gain 408. The output of amplifier 408 may be limited by current limiter 406. In accordance with a preferred embodiment, the output of controller C2 and current amplifier (208 of FIG. 2) is a current fed into motor with gearbox (i.e., 210 of FIG. 2).

A simulation environment incorporating a mathematical model of the motor with gearbox 210 (of FIG. 2) may be implemented as shown in FIG. 5. Motor current output from controller C2 and current amplifier (208, FIG. 2) is modified by motor torque constant Kt with amplifier 504 and is then fed into summer 500. Also fed into summer 500 is a load torque signal modified by the reciprocal gearbox ratio (1/GR) within gearbox (e.g., 210 of FIG. 2) with amplifier 506. The output of summer 500 is modified by the motor rotor inertia unit 502, and is then modified by the reciprocal gearbox ratio (1/GR) within gearbox (e.g., 210 of FIG. 2) with amplifier 508. The output of the model for the motor with gearbox 210 is the joint position q1.

A mathematical model for the flexible robotic arm 212 (FIG. 2) may be implemented for purposes of simulation using a processor-based system programmed to satisfy the mathematical model depicted in FIG. 6. A typical model transfer function, Gsys2, for the mathematical model is depicted below as:

$$G_{sys2}(s, G_f) = \frac{\left(K_1 - \frac{K_1 \cdot G_2(s)}{L}\right) \cdot s + \left(P_1 - \frac{P_1 \cdot G_2(s)}{L}\right)}{\left(\frac{GR^2 \cdot J_m}{P_2}\right) \cdot s^2 + (K_1) \cdot s + \left(G_f G_1(s) + \frac{G_1(s)}{P_2} + P_1\right)}$$

where G1 and G2 can be defined by the empirical values depicted in Table 3 below as:

TABLE 3

| | |
|---|---|
| Kt = 0.16; | % N m/A |
| Jm = 3.2e-5; | % kg m2 |
| L = 0.273; | % m |
| GR = 20; | % gearbox ratio |
| % payload is 0.050 kg | |
| n6 = −2.716e-6; | |
| n5 = −7.218e-5; | |
| n4 = −3.049; | |
| n3 = −23.246; | |
| n2 = −2.798e5; | |
| n1 = 0; | |
| n0 = 0; | |
| D6 = −9.942e-6; | |
| D5 = −2.675e-4; | |
| D4 = −11.176; | |
| D3 = −88.41; | |
| D2 = −1.018e6; | |
| D1 = −3.897e5; | |
| D0 = −3.242e8; | |
| N6 = −6.502e-5; | |
| N5 = −1.116e-3; | |
| N4 = −46.481; | |
| N3 = −162.542; | |
| N2 = −1.849e6; | |
| N1 = 0; | |
| N0 = 0; | |

Figure 19:
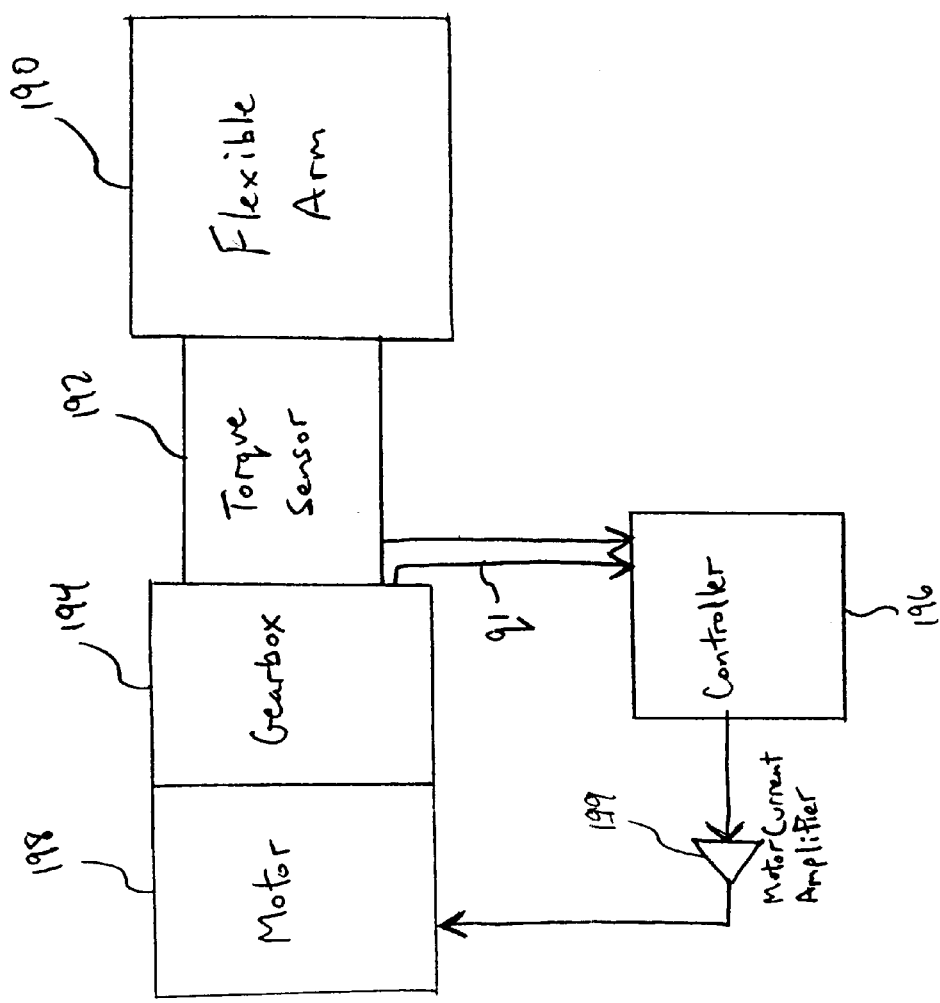
FIG. 19 depicts a block diagram of a system in accordance with a preferred embodiment of the invention.

FIG. 19 illustrates a simplified block diagram of a control system in accordance with a preferred embodiment of the invention. As shown, a flexible arm 190 of a robotic manipulator is coupled on one end to a joint torque sensor 192. The joint torque sensor 192 is depicted as also being coupled to gearbox 194. Gearbox 194 is in turn coupled to motor 198. Joint torque sensor 192 can take the form of any known sensor in the art and therefore the specific construction of it will not be further described herein. Joint torque sensor 192 is also depicted in this illustrative embodiment as being coupled to a controller 196. Controller 196 may consist of a processor (such as e.g., a digital signal processor) for processing the torque data received from joint torque sensor 192. In a preferred embodiment, controller 196 processes data associated with the position of the output of gearbox 194 (i.e., q1) and combines it with the joint torque data to determine what, if any, force needs to be applied to the arm 190 in order to position the arm 190 in a desired manner.

For illustration purposes, detailed analysis of a variety of specific embodiments of the invention are provided as examples below.

Figure 7A:
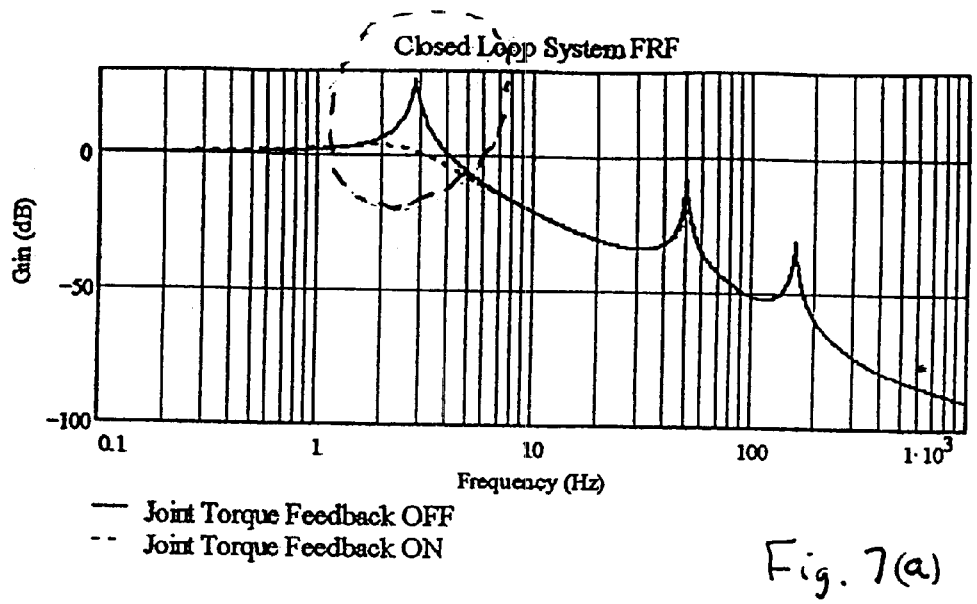
FIG. 7 depicts closed loop frequency response in accordance with a preferred embodiment of the invention.
Figure 8A:
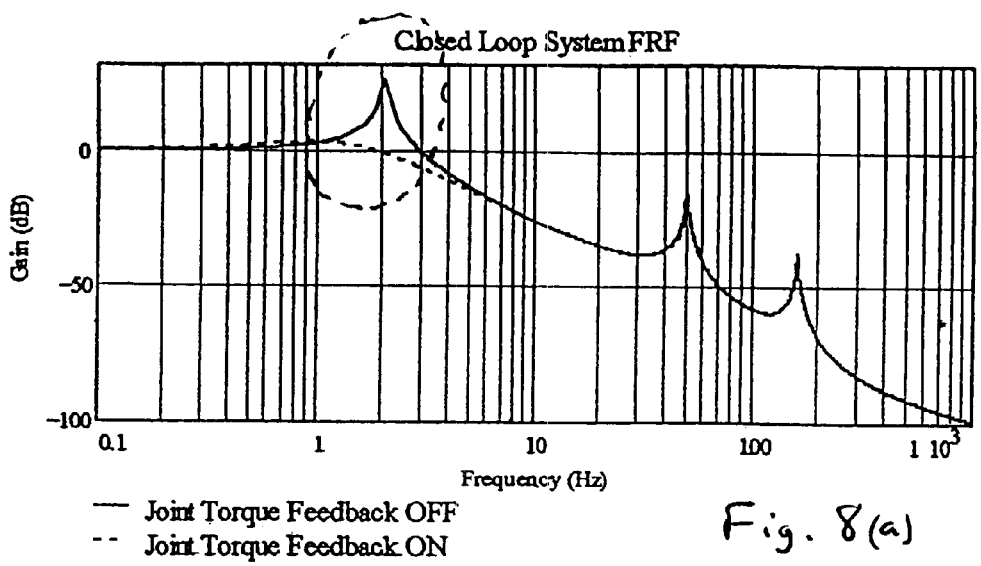
FIG. 8 depicts closed loop frequency response in accordance with a preferred embodiment of the invention.

FIGS. 7(a) and 8(a) respectively depict the frequency response upon the first natural frequency of a flexible arm of manipulators having a 50 gm payload and a 120 gm payload.

Figure 7B:
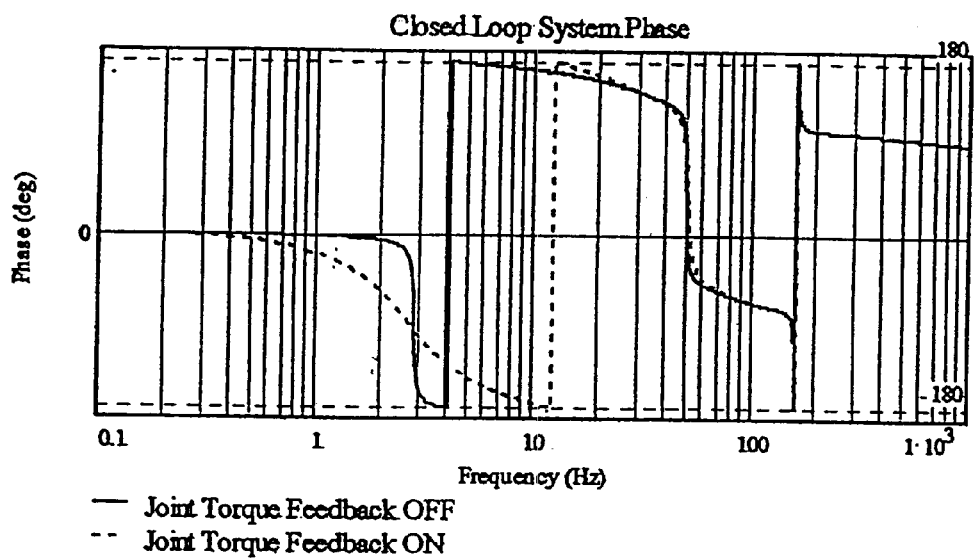
Figure 8B:
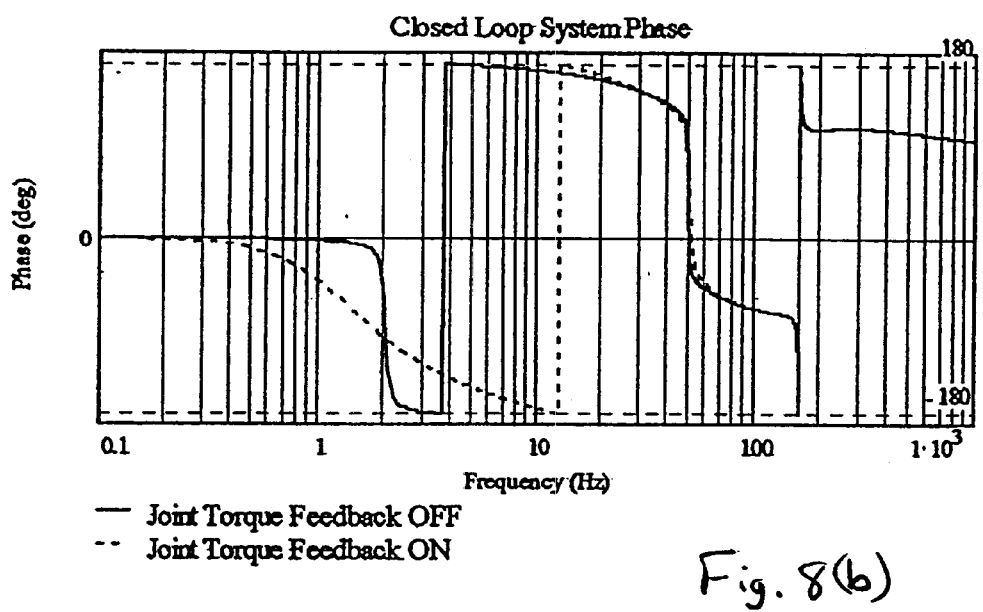

As can be seen in the logarithmic scales, a control system in accordance with a preferred embodiment of the invention virtually or substantially eliminates the first natural frequency (FIGS. 7(a) and 8(a)). It has been found that it is the first natural frequency that has the greatest effect upon the stability of the flexible arm, whereas the effects upon the arm's stability of the second and third frequencies are comparably negligible. This is evident as the magnitude of vibration displacement decreases for the same acceleration levels as frequency increases. Therefore, by eliminating the instability of the first frequency, the stability of the flexible arm can be maintained. FIGS. 7(b) and 8(b) respectively depict improvements in phase relationship and stability for both a 50 gm payload and a 120 gm payload. It should also be noted that the fundamental frequency changes from approximately 3.0 Hz (of FIG. 7(a)) to approximately 2.0 Hz (of FIG. 8(a)) and the system's higher natural frequencies remain approximately 50 Hz and 160 Hz. These results mean two things. First, the FIG. 2 control system automatically adapted to changes in the system's fundamental natural frequency and suppressed this natural frequency. Second, the dual torque-displacement control scheme produces pin-free boundary conditions for the arm. Hence, the dual torque-displacement control scheme creates a pin-free robotic arm while rapidly moving the arm from one position to another.

Figure 9A:
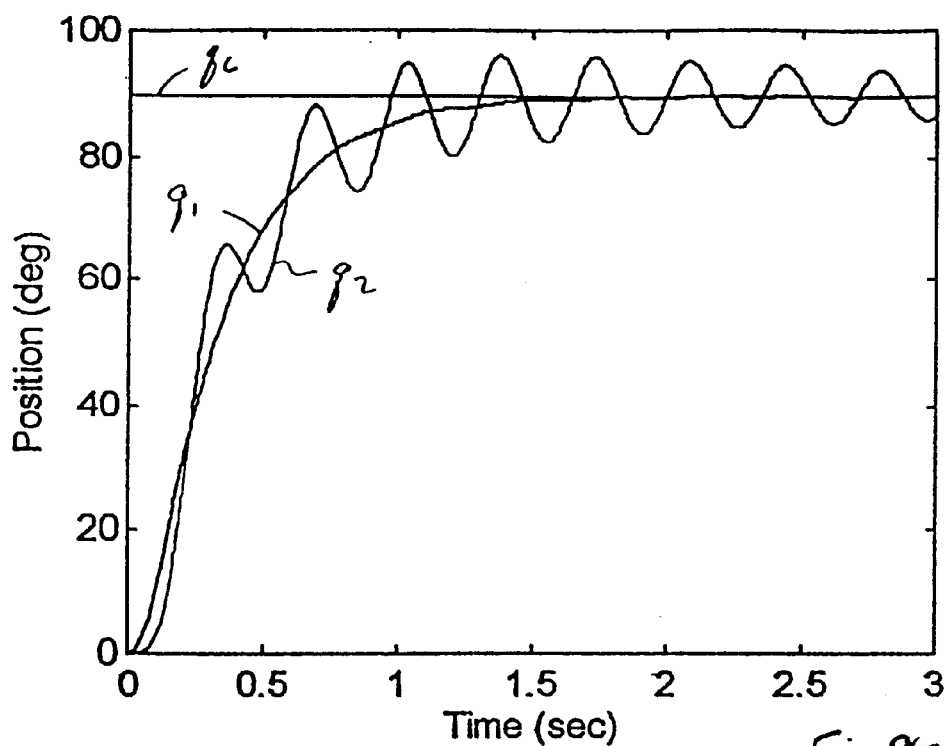
FIGS. 9–10 depict system performance with joint torque sensor off.
Figure 10A:
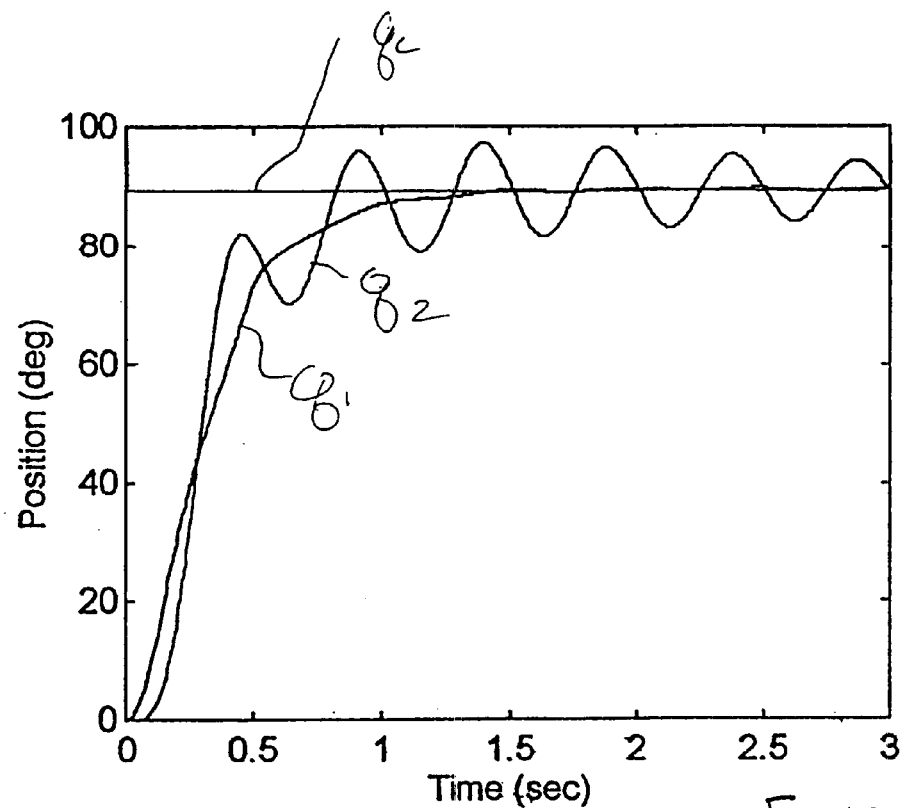

FIGS. 9(a) and 10(a) respectively depict the instability of the arm tip position q2, for both a 50 gm payload and a 120 gm payload, without the use of a control system incorporating a preferred embodiment of the invention. As can be seen, the end motion q2 oscillates at approximately 3.0 Hz in FIG. 9(a) and approximately 2.0 Hz in FIG. 10(a) while the position command qc is never followed. To the contrary, FIGS. 11(a)–16(a) depict both q1 and q2 conforming with the input command in a relatively fast timeframe when using a control system in accordance with a preferred embodiment of the invention for a 30 degree command and a 120 gm payload, for a 60 degree command and a 120 gm payload, for a 90 degree command and a 120 gm payload, for a 30 degree command and a 50 gm payload, for a 60 degree command and a 50 gm payload, and for a 90 degree command and a 50 gm payload, respectively.

Figure 9B:
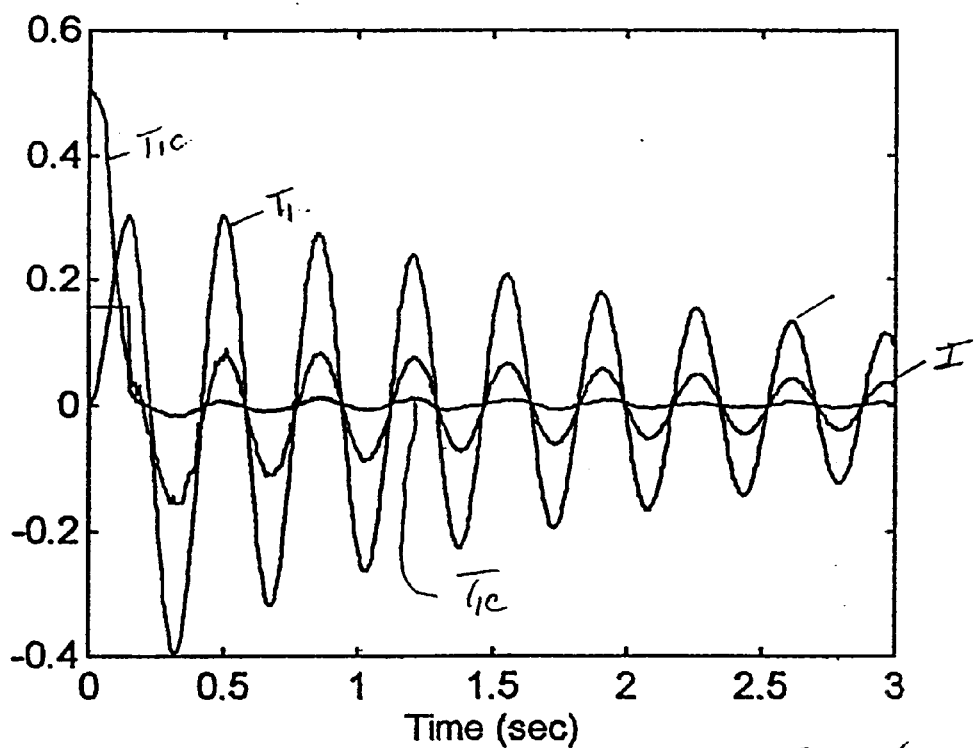
Figure 10B:
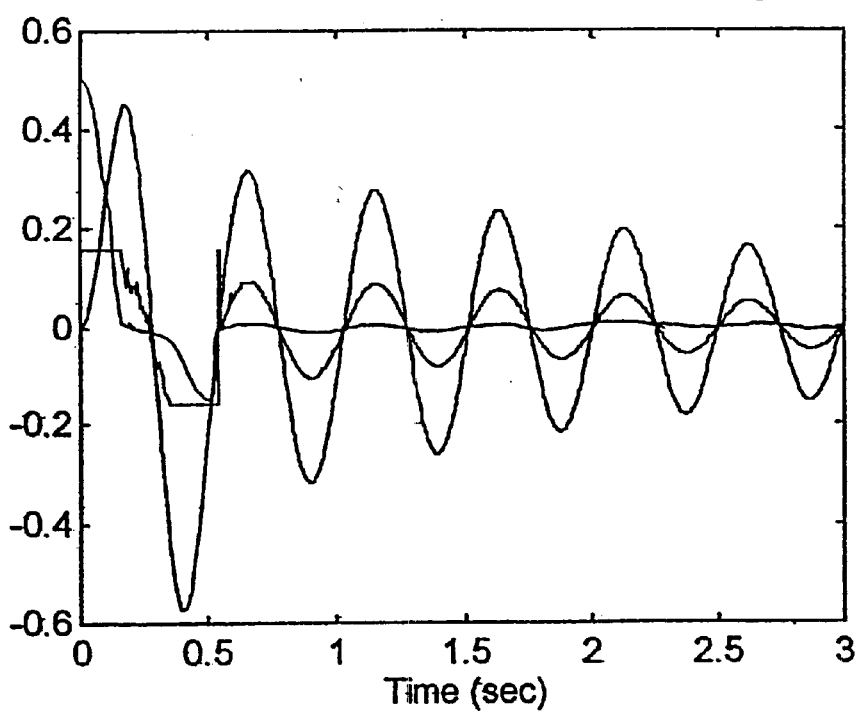
Figure 11A:
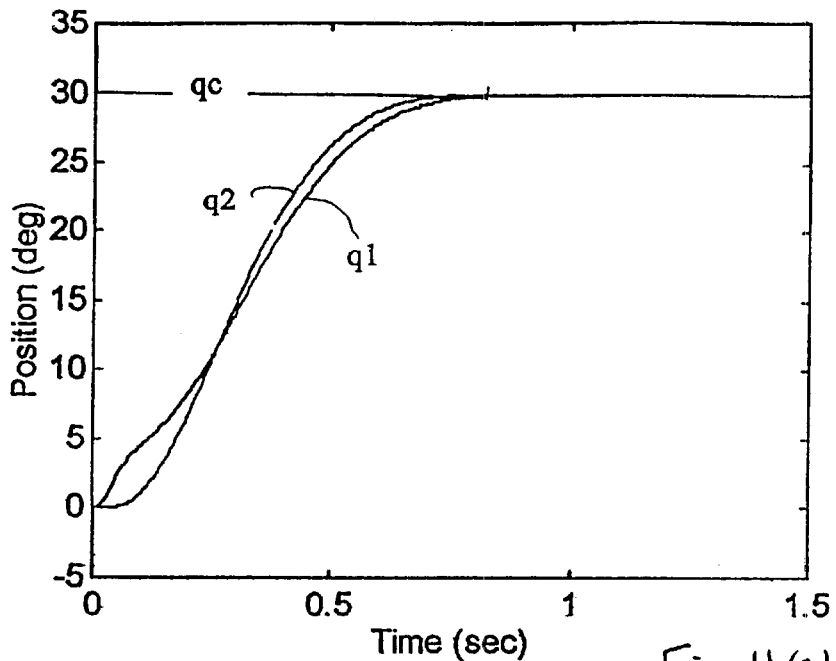
FIG. 11 depicts system response with joint torque sensor on, a 30 degree command and 120 gm payload in accordance with a preferred embodiment of the invention.
Figure 11B:
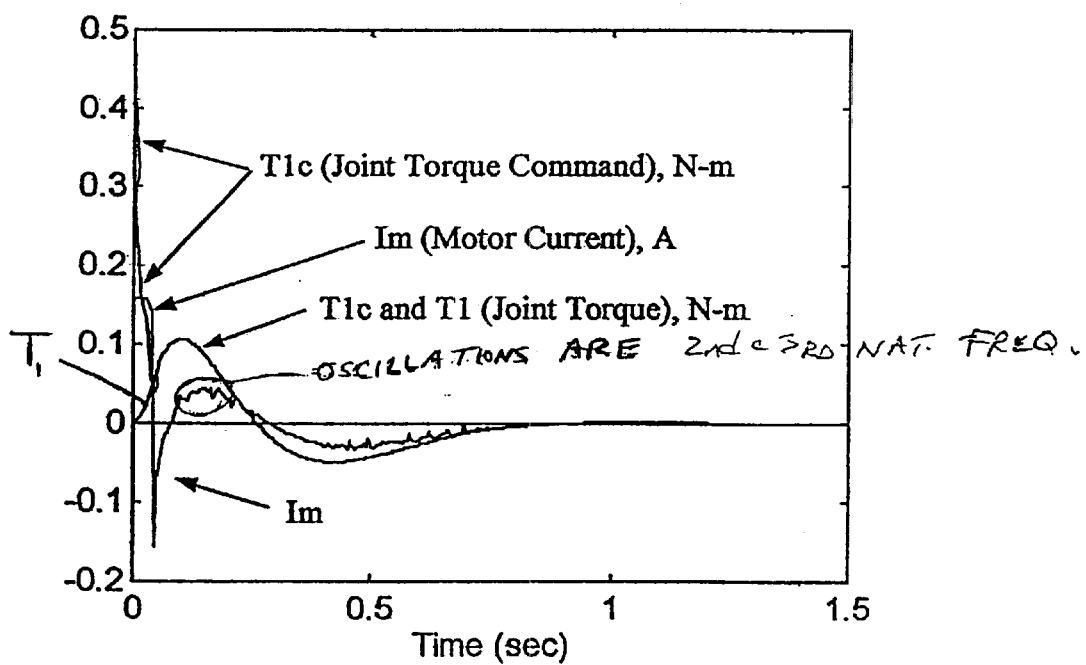
Figure 12A:
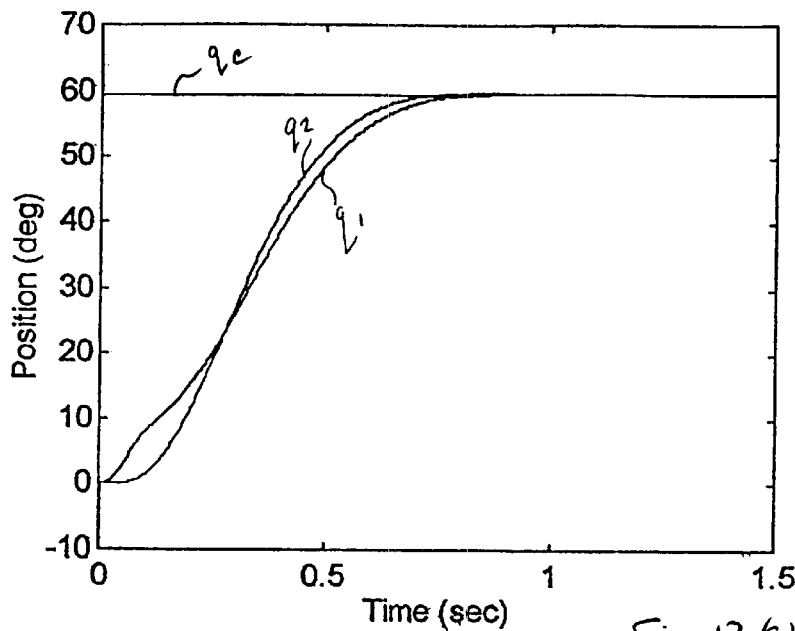
FIG. 12 depicts system response with joint torque sensor on, a 60 degree command and 120 gm payload in accordance with a preferred embodiment of the invention.
Figure 12B:
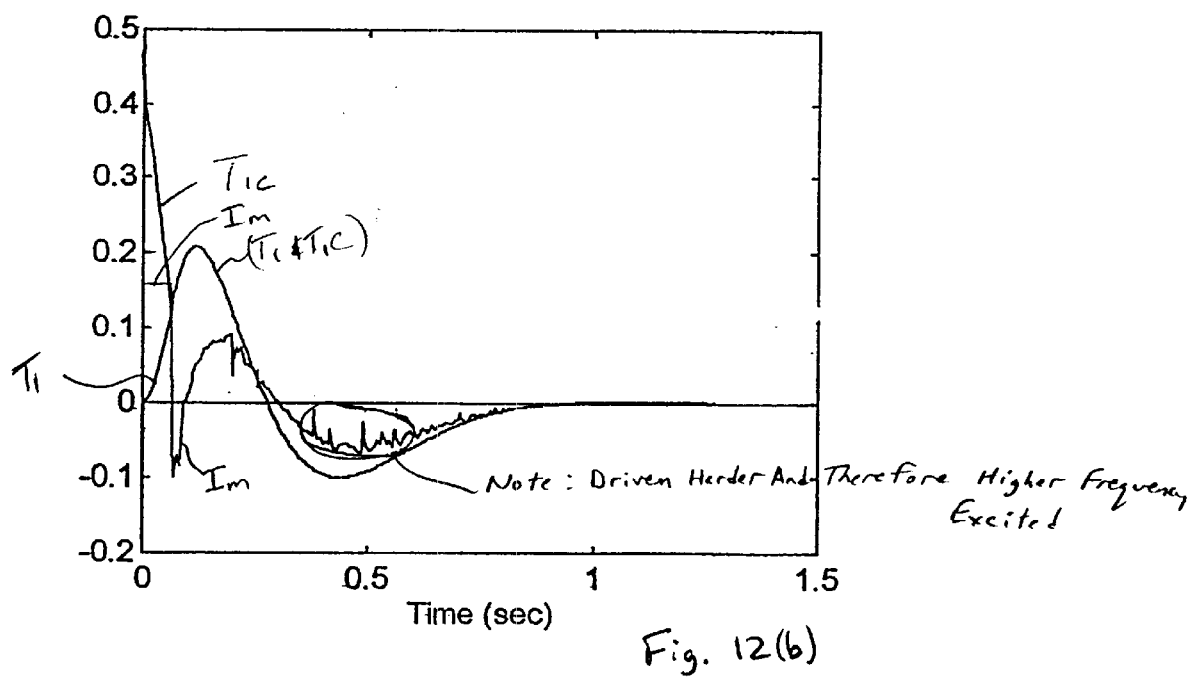
Figure 16A:
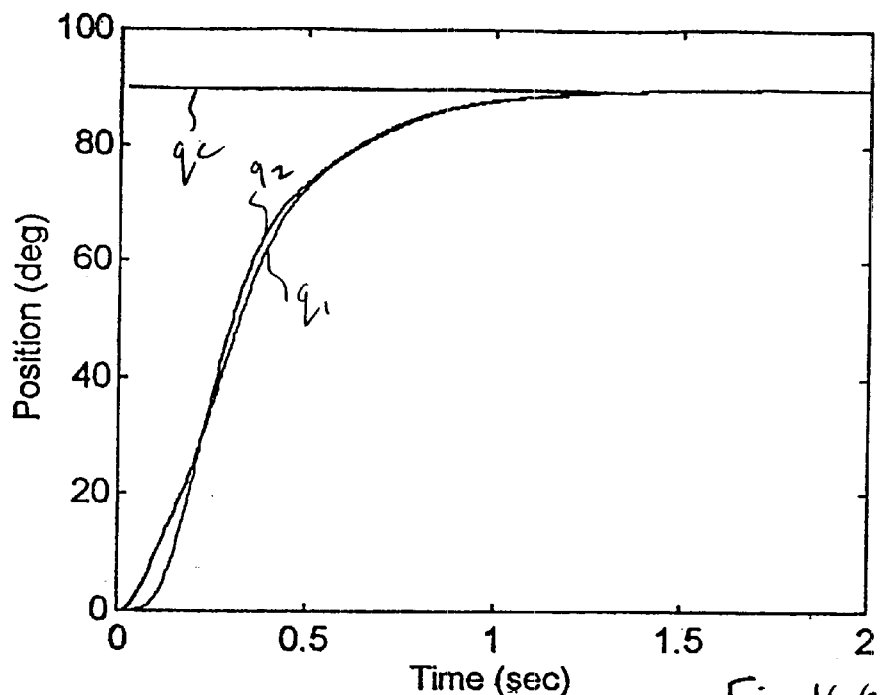
FIG. 16 depicts system response with joint torque sensor on, a 90 degree command and 50 gm payload in accordance with a preferred embodiment of the invention.
Figure 16B:
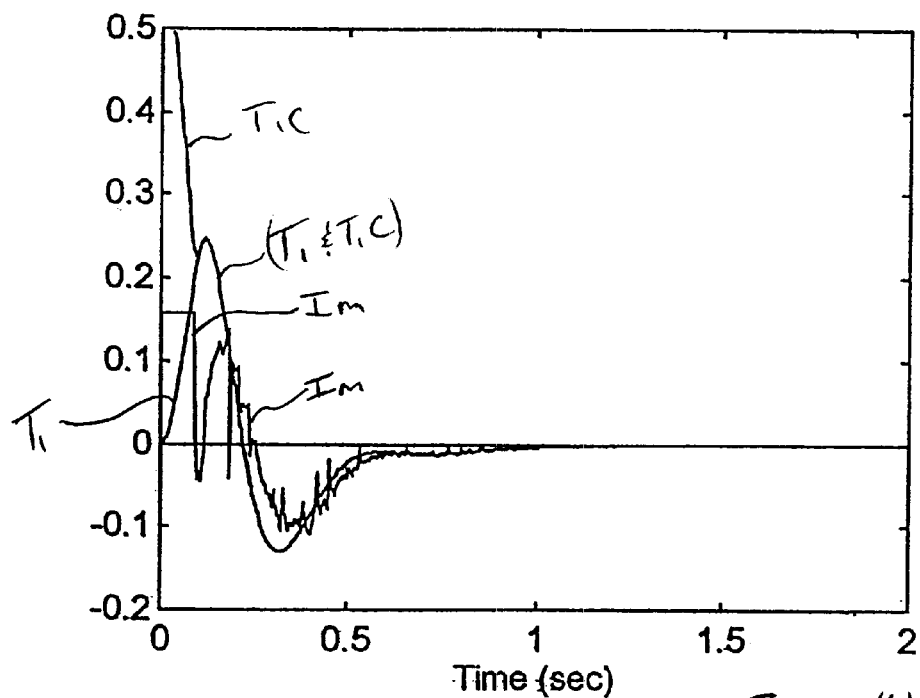

FIGS. 9(b) and 10(b) depict response times for T1c, Im and (T1c and T1) without use of a control system incorporating a preferred embodiment of the invention. FIGS. 11(b)–16(b) depict response times of these same parameters for the conditions described above in connection with FIGS. 11(a)–16(a).

Figure 13A:
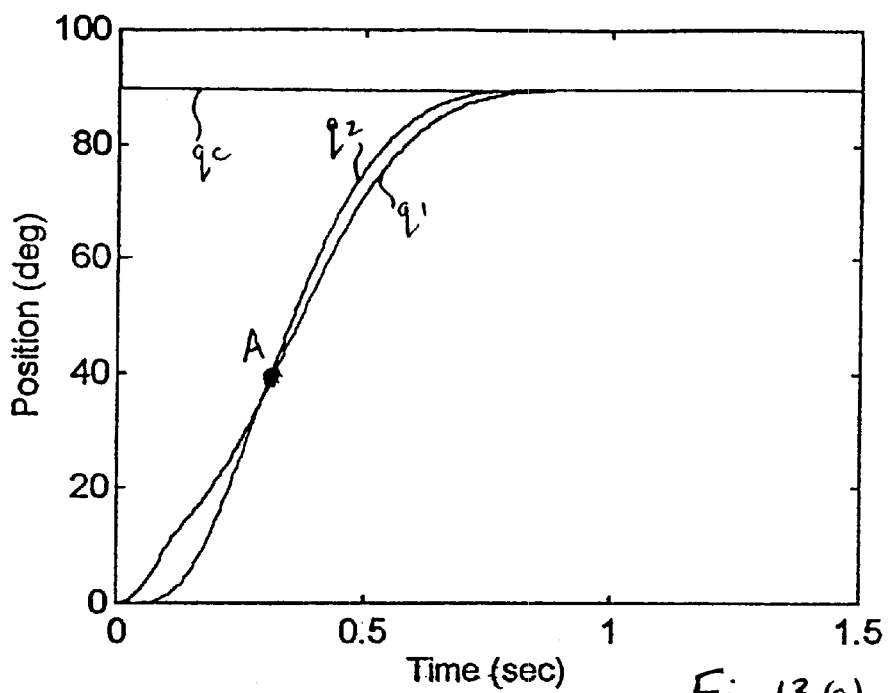
FIG. 13 depicts system response with joint torque sensor on, a 90 degree command and 120 gm payload in accordance with a preferred embodiment of the invention.
Figure 13B:
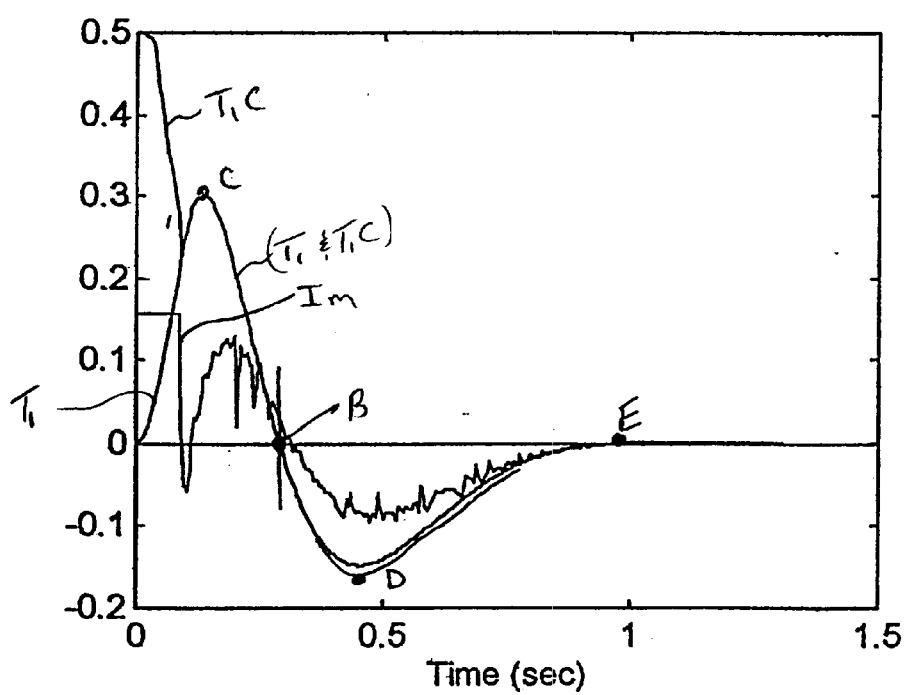
Figure 14A:
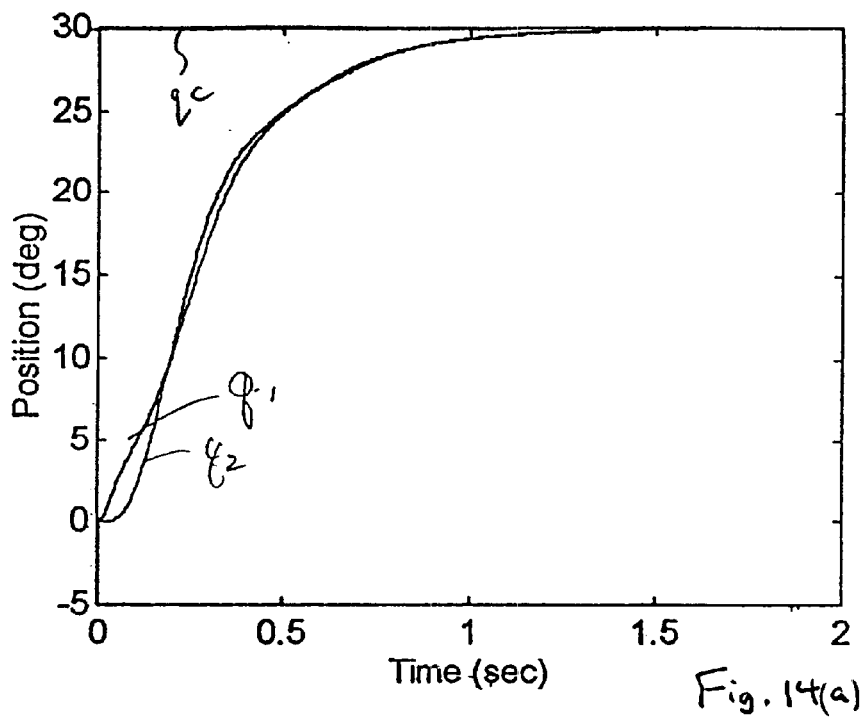
FIG. 14 depicts system response with joint torque sensor on, a 30 degree command and 50 gm payload in accordance with a preferred embodiment of the invention.
Figure 14B:
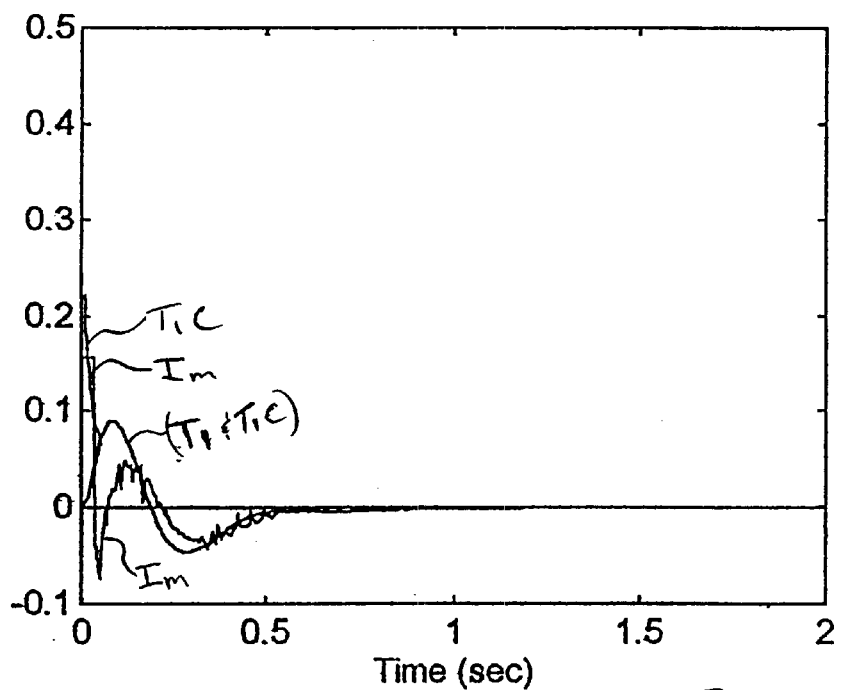
Figure 15A:
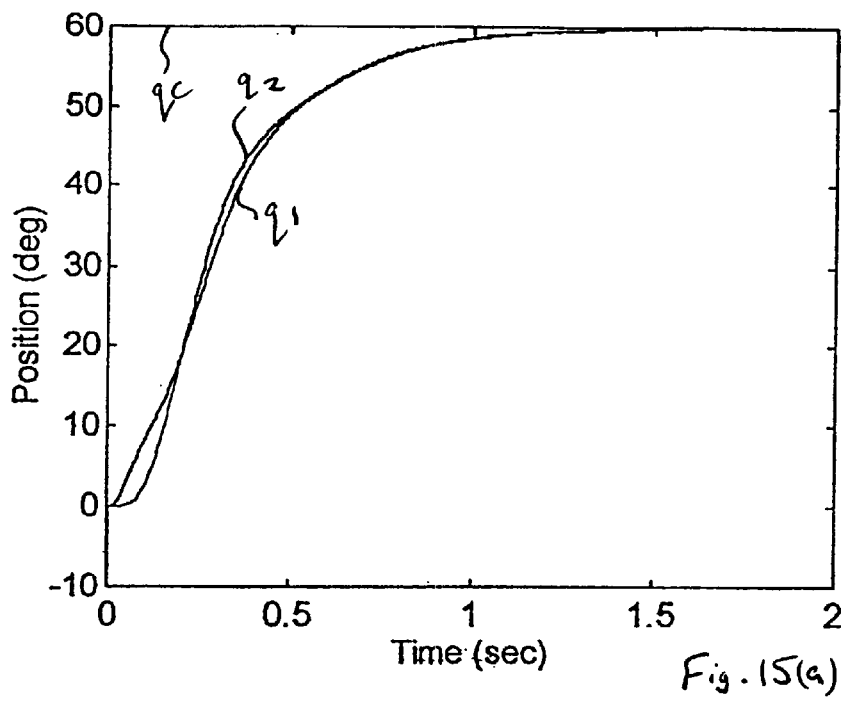
FIG. 15 depicts system response with joint torque sensor on, a 60 degree command and 50 gm payload in accordance with a preferred embodiment of the invention.
Figure 15B:
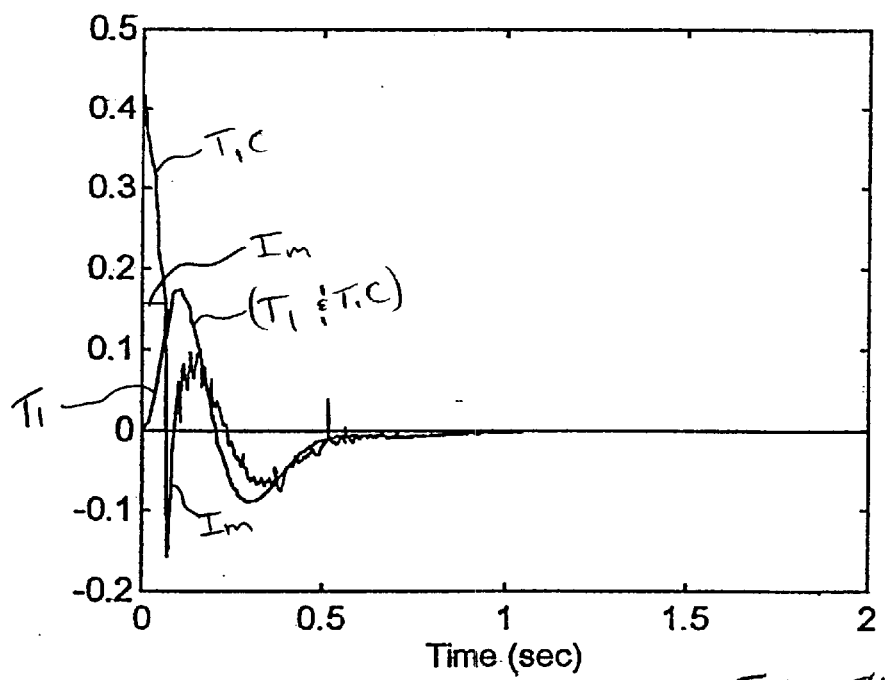

Referring to FIGS. 13(a) and (b), for example, as can be seen, the step command $q_c$, goes from zero to 90 degrees. At first, the corresponding motion of q1 is seen to increase much faster than the output motion q2. At approximately 40 degrees, these two positions are equal as indicated by point A. For positions greater than 40 degrees, q2 is larger than q1 since the base lags the output position in order to slow down and stop the arm. The behavior of q1 and q2 for a torque-controlled system without the base motion feedback gave similar results as FIG. 13(a). FIG. 13(b) shows the basic behavior of torque and currents when the input is a step. First, note that the current is limited to a maximum value of about 0.16 A for this example. During the current limited motion, T1c>T1. When the current stops being saturated, the two torques (T1c and T1) become essentially equal. Torques T1c and T1 pass through zero at point B which corresponds to point A in FIG. 13(a). After point B, the torques and current become negative in order to stop the beam. These negative torques at point D are about one-half as large as the positive torques at point C. Consequently, the time between point B to point E is greater than the time between zero to point B.

Figure 17A:
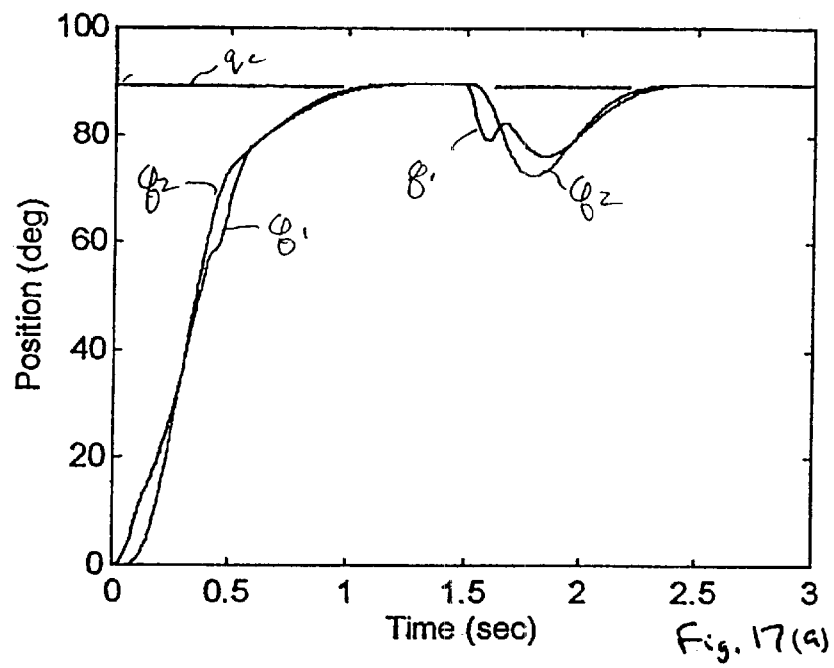
FIG. 17 depicts system response to two disturbances with joint torque sensor on, and an exemplary 120 gm payload in accordance with a preferred embodiment of the invention.
Figure 17B:
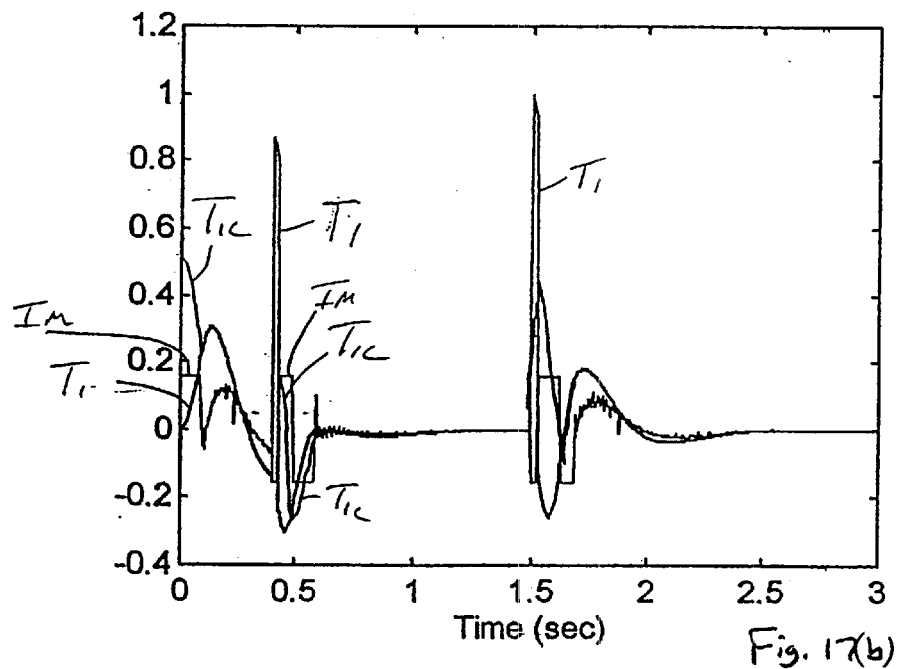
Figure 18A:
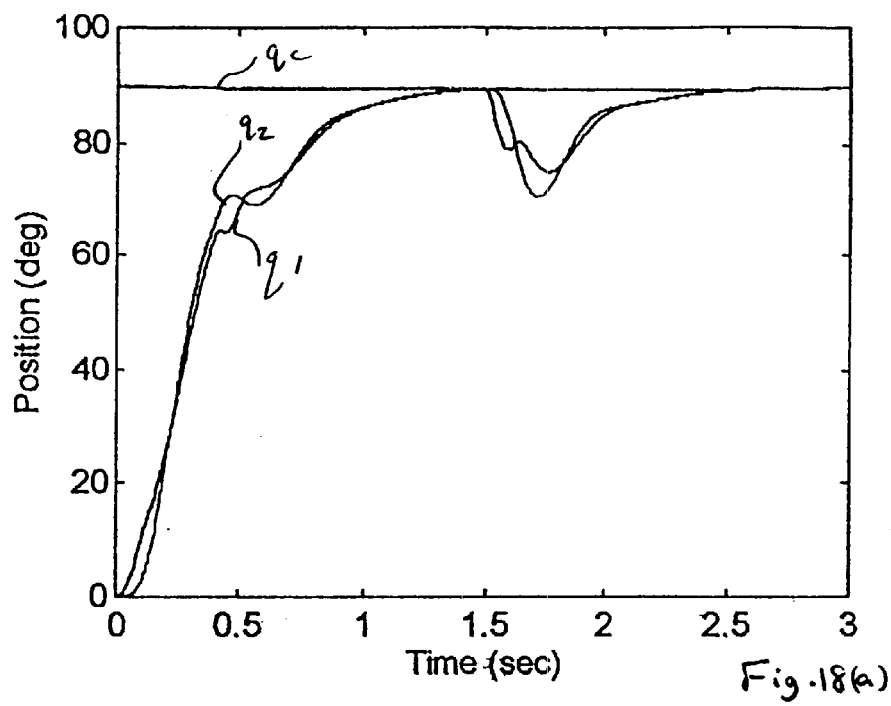
FIG. 18 depicts system response to two disturbances with joint torque sensor on, and an exemplary 50 gm payload in accordance with a preferred embodiment of the invention.
Figure 18B:
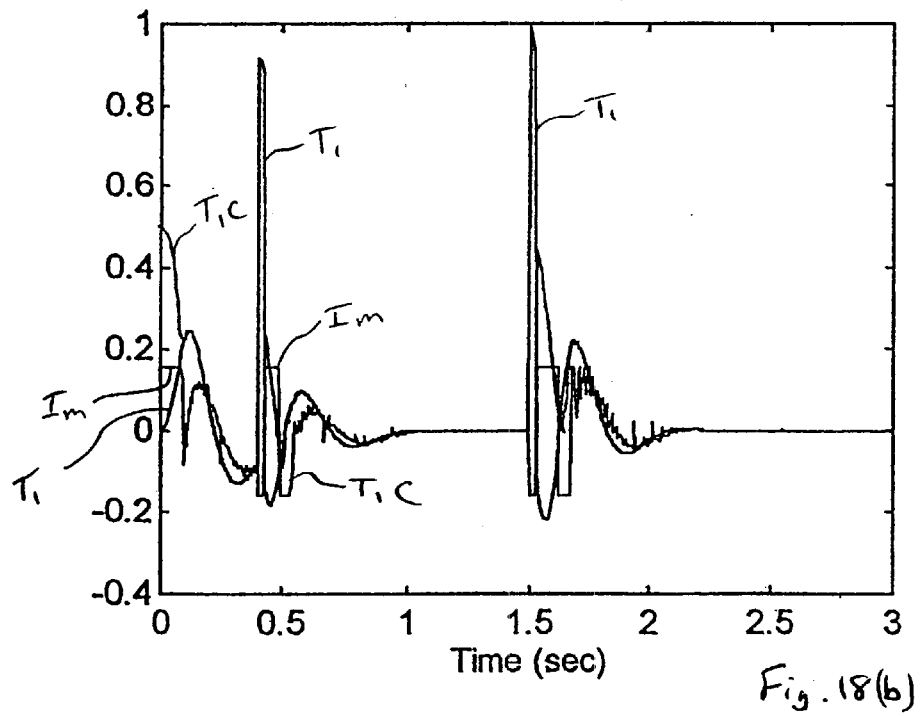

FIGS. 17(a) and 18(a) respectively depict the response to two separate disturbances being introduced for a 120 gm load and a 50 gm load using a manipulator in accordance with a preferred embodiment of the invention. As can be seen, both q1 and q2 conform to qc upon recovering from each disturbance. FIGS. 17(b) and 18(b) depict the T1c, Im and T1 parameters for each respective condition.

While preferred embodiments of the invention have been described and illustrated, it should be apparent that many modifications (e.g., structural, logical, etc.) to the embodiments and implementations of the invention can be made without departing from the spirit or scope of the invention. For example, while the exemplary embodiments disclosed herein depict only a multi-axis robotic manipulator, it should be readily apparent that the invention may be implemented in a manipulator or other system having only a single (or any other number) movable arm or member. Alternative embodiments further include both centralized and decentralized distribution of joint torque sensors and joint control systems (e.g., single control system controlling a plurality of joint torque sensors, multiple control systems controlling one or more joint torque sensors). One or more of the joint control systems may be controlled by a centrally located manipulator control system or some other controlling mechanism. The joint or arm torque measurements or determinations described herein may be provided by any known sensing or calculating device for detecting, determining, or otherwise deriving torque levels. The torque levels may be taken as the torque at the arm joint, gearbox output shaft, or other equivalent locations.

The modules and mathematical models described herein, particularly those illustrated in FIGS. 1–6 and 19, may be one or more hardware, software, or hybrid components residing in (or distributed among) one or more local or remote computer systems. Although the modules are shown as physically separated components, it should be readily apparent that individual modules may be omitted, combined, or further separated into a variety of different components, sharing different resources (including processing units, memory, clock devices, software routines, etc.) as required for the particular implementation of the embodiments disclosed herein. Indeed, even a single general purpose computer executing a computer program stored on a recording medium to produce the functionality and any other memory devices referred to herein may be utilized to implement the illustrated embodiments. Any user interface devices utilized (not shown) may be implemented as a graphical user interface (GUI) containing a display or the like, or may be a link to other user input/output devices known in the art.

In addition, memory units described herein may be any one or more of the known storage devices (e.g., Random Access Memory (RAM), Read Only Memory (ROM), hard disk drive (HDD), floppy drive, zip drive, compact disk-ROM, DVD, bubble memory, etc.), and may also be one or more memory devices embedded within a processor or CPU, or shared with one or more of the other components. The computer programs or algorithms described herein may easily be configured as one or more hardware modules, and the hardware modules shown may easily be configured as one or more software modules without departing from the invention. Accordingly, the invention is not limited by the foregoing description or drawings.

What is claimed as new and desired to be protected by Letters Patent of the United States is:

1. A method of controlling movement of an object, the method comprising:

determining joint torque at an adjacent joint in a location adjacent to the object;

determining the position of the object at said joint; and eliminating a fundamental natural frequency of the object by controlling movement of the object if at least one of said joint torque and said position differ from respective predetermined values.

2. The method of claim 1, wherein said act of determining joint torque comprises determining joint torque at an adjacent joint located between the object and a gearbox coupled to the object.

3. The method of claim 2, wherein said act of determining joint torque further comprises determining external joint torque disturbance.

4. The method of claim 2, wherein said act of determining joint torque comprises sensing joint torque at said adjacent joint, wherein said adjacent joint is located between the object and the gearbox.

5. The method of claim 2, wherein said act of determining joint torque comprises calculating joint torque at said adjacent joint based upon a mathematical representation of the object.

6. The method of claim 2, wherein said act of controlling further comprises:

comparing the position of the object with a predetermined value in the form of a position command; and generating a joint torque command.

7. The method of claim 6, wherein said act of controlling further comprises:

comparing said joint torque with a predetermined value in the form of said joint torque command; and generating a control signal as a result of said act of comparing said joint torque for modifying at least one force exerted on the object.

8. The method of claim 7, wherein said act of generating a control signal comprises generating a control signal for adjusting an input current to a motor coupled to said gearbox.

9. The method of claim 1, wherein the method of controlling movement of an object is performed on an object in the form of a flexible robotic arm.

10. A control system for controlling movement of an object, the system comprising:

a joint torque sensor for sensing joint torque at an adjacent joint located adjacent to the object;

a position sensor for sensing a position of the object at said joint; and a controller for eliminating a fundamental natural frequency of the object by controlling movement of the object based upon at least one of said joint torque and said position.

11. The control system of claim 10, wherein said joint torque sensor senses torque at said adjacent joint located between the object and a gearbox coupled to the object.

12. The control system of claim 11, wherein the joint torque sensor further comprises an external joint torque disturbance sensor for sensing an external disturbance on the object.

13. The control system of claim 11, wherein said controller generates a control signal to modify at least one force exerted on the object in controlling movement of the object, the control system further comprising a motor coupled between the gearbox and said controller, wherein said motor receives said control signal from the controller to control movement of the object.

14. The control system of claim 13, further comprising a motor current amplifier coupled between said controller and said motor for amplifying a motor input current sent to said motor.

15. The control system of claim 10, wherein the object comprises at least one flexible robotic arm.

16. A manipulator comprising:

at least one robotic member coupled to at least one joint;

at least one joint control circuit, wherein said joint control circuit comprises:

a position command unit issuing an instruction input in the form of a position command;

a first summer circuit obtaining a difference between the instruction input and a position feedback signal measured at the joint to produce a position error signal;

a second summer circuit obtaining a difference between an external joint torque disturbance of the manipulator and a joint torque measurement of said at least one robotic member to produce a joint torque error signal;

a first controller, coupled to said first summer circuit, for receiving the position error signal produced by said first summer circuit, said first controller summing a derivative of the position error signal and the position error signal to produce a joint torque command;

a second controller, coupled to said second summer circuit, receiving the joint torque error signal from said second summer circuit and producing a motor torque error signal; and a motor with a gearbox, coupled to said second controller, generating a joint position signal based on the motor torque error signal produced by said second controller.

17. The manipulator of claim 16, wherein said at least one robotic member is a plurality of flexible robotic arms, wherein each robotic arm is serially connected at one end to another flexible robotic arm at one end through at least one joint; and wherein said at least one joint control circuit is located in at least one joint for control of at least one robotic arm.

18. The manipulator of claim 17, wherein said at least one joint control circuit is a plurality of joint control circuits for respectively controlling respective ones of said plurality of robotic arms, each joint control circuit being respectively located in a joint connected to at least one robotic arm.

19. A method of controlling a flexible robotic arm by automatically adapting to changes in the flexible robotic arm's fundamental natural frequency, eliminating said fundamental natural frequency of the flexible robotic arm, and producing pin-free boundary conditions for the flexible robotic arm.

20. The method of controlling a flexible robotic arm as recited in claim 19, wherein said adapting and eliminating step comprises:

sensing joint torque at a joint between a gearbox and a base end of the robotic arm coupled to the gearbox;

sensing a position of the base end of the robotic arm; and modifying an input current to a motor coupled to the gearbox in response to sensing of at least one of the joint torque and the position of the base end.

* * * * *